United States Patent [19]

Lapeyre

[11] 4,130,942
[45] Dec. 26, 1978

[54] BOREHOLE SURVEYING APPARATUS

[75] Inventor: James M. Lapeyre, New Orleans, La.

[73] Assignee: The Laitram Corporation, New Orleans, La.

[21] Appl. No.: 800,933

[22] Filed: May 26, 1977

[51] Int. Cl.² .................................................. G01C 9/04
[52] U.S. Cl. ........................................ 33/312; 33/313; 33/363 K
[58] Field of Search ............. 33/308, 313, 312, 363 K, 33/1 H

[56] References Cited
U.S. PATENT DOCUMENTS

| 3,077,670 | 2/1963 | Waters | 33/313 |
| 3,544,957 | 12/1970 | Smetanin et al. | 33/312 |
| 3,693,142 | 9/1972 | Jones | 33/308 |
| 3,771,118 | 11/1973 | Lichte, Jr. et al. | 33/308 |
| 3,791,043 | 2/1974 | Russell | 33/312 |
| 3,833,901 | 9/1974 | Fowler | 33/363 K X |
| 4,021,774 | 5/1977 | Asmundsson et al. | 33/313 X |

Primary Examiner—William D. Martin, Jr.
Attorney, Agent, or Firm—Weingarten, Maxham & Schurgin

[57] ABSTRACT

Apparatus for borehole surveying employing remote reading electro-optical sensors for providing digital signals represenatative of azimuth and multi-axis inclination for direct transmission to the surface for recording or use.

6 Claims, 4 Drawing Figures

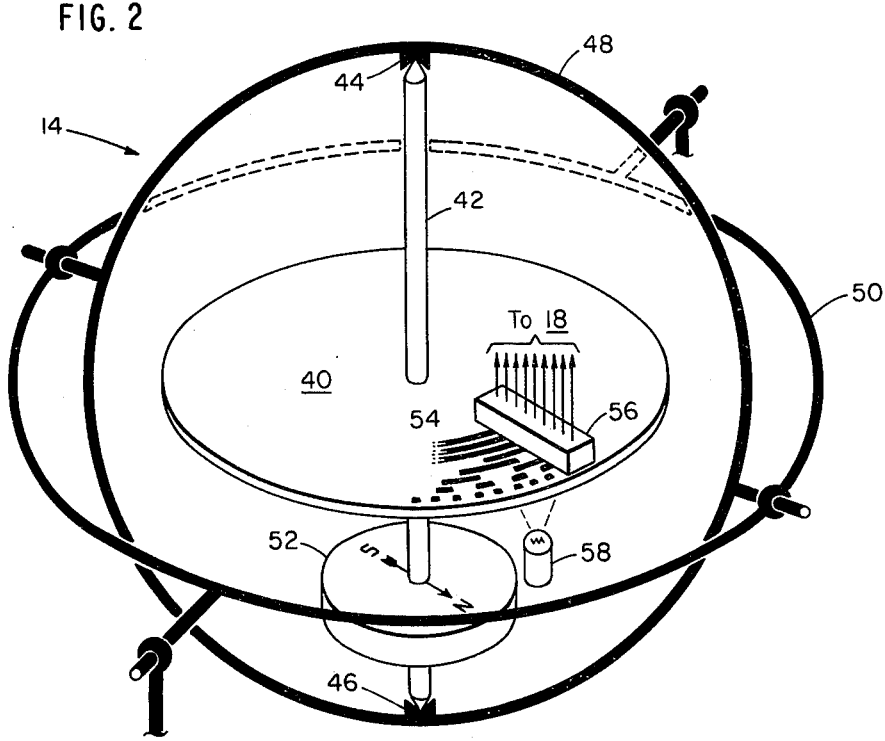
FIG. 2
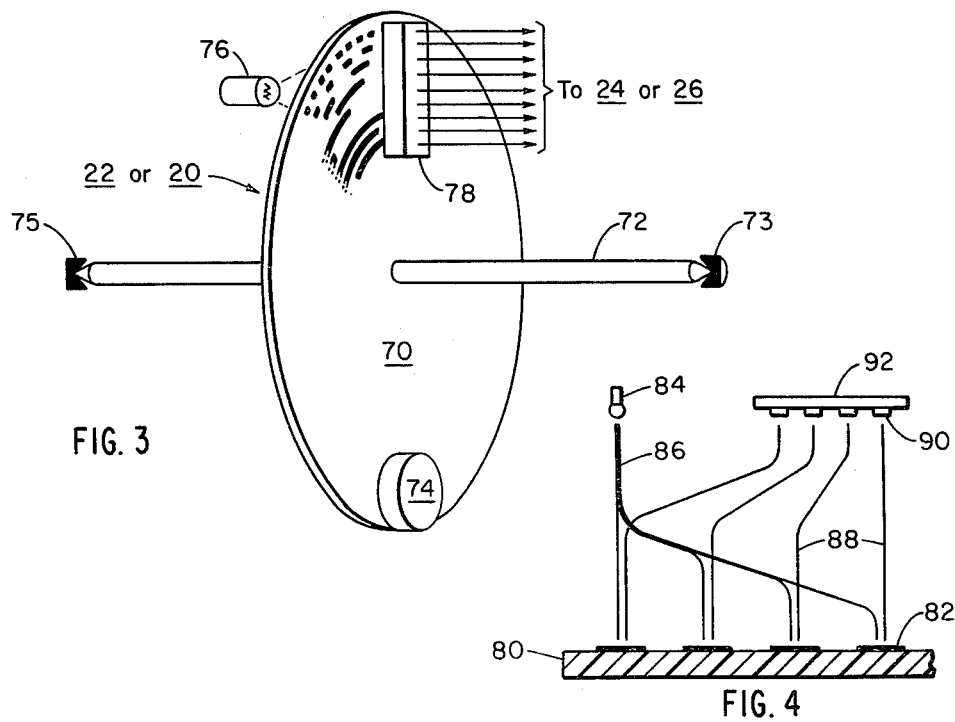
FIG. 3
FIG. 4

BOREHOLE SURVEYING APPARATUS

FIELD OF THE INVENTION

This invention relates to borehole surveying and more particularly to apparatus for providing signal indications of inclination and azimuth of an instrumentation package in a borehole.

BACKGROUND OF THE INVENTION

Instrumentation is known for borehole surveying to obtain geophysical and other data for oil and mining operations. It is usually necessary to know the orientation of the instrument package in the well for directional surveying or directional drilling. In apparatus of known construction orientation information is provided by a gyro or magnetic compass within the instrument package and associated with a photographic recorder operative to store and provide a record of compass readings for use after the instrument package is raised from the well. Information with respect to inclination is generally provided by a pendulous instrument associated with a photographic recorder to provide a record which is usable after the instrument package is removed from the well.

Instrumentation is also known for telemetering orientation data to the surface of a well. Gyro compasses have been employed to provide azimuth information, and with an electrical signal indication thereof being transmitted to the well surface. Gyro compasses are however relatively expensive and require energizing power for driving the gyro rotor. Other transducer structures have been provided for providing an electrical signal indication of orientation for transmission to the well surface. For example, in U.S. Pat. No. 3,622,971, a magnetic transducer is described for use in directional drilling and wherein a magnetic reference member is maintained in a stationary position during drilling operations and released during cessation of drilling to seek a different orientation and provide a signal indication thereof. Such transducer structure is relatively complicated and requires selective clamping and unclamping for operation with an associated drill string.

SUMMARY OF THE INVENTION

In accordance with this invention, apparatus is provided for borehole surveying employing remote reading electro-optical sensors for providing digital signals representative of azimuth and multi-axis inclination for direct transmission to the surface for recording or use, or for in situ recording. Housed within a non-magnetic casing such as a drill collar, is a digital magnetic compass providing a digital signal representing compass heading, and one or more digital inclinometers providing digital signals representing inclination with respect to one or more axes.

The digital compass and digital inclinometers each include a disk containing an optically sensible code thereon in the form of a plurality of coded concentric tracks each containing a different plurality of alternately light responsive and non-responsive segments each track representing one bit of a multi-bit digital code. A photosensor array is disposed with respect to the coded tracks of the disk and a light source is disposed to illuminate the coded tracks, light therefrom being received by the sensor array to provide a plurality of digital signals representative of disk position relative to the array. These signals are processed by associated circuitry to provide an appropriate output signal format for transmission to the well surface. Typically, the compass and inclinometer signals are multiplexed to provide a composite signal for transmission to the well surface where the composite signal can be decoded to provide respective signal indications of azimuth and inclination. The orientation signals can also be stored in situ by means of a data recorder.

DESCRIPTION OF THE DRAWINGS

The invention will be more fully understood from the following detailed description taken in conjunction with the accompanying drawings in which:

FIG. 2 is a diagrammatic representation of a digital magnetic compass employed in the invention;

FIG. 3 is a diagrammatic representation of a digital inclinometer employed in the invention; and FIG. 4 is a diagrammatic representation of a reflective electro-optical sensor employed in the invention.

DETAILED DESCRIPTION OF THE INVENTION

Figure 1:
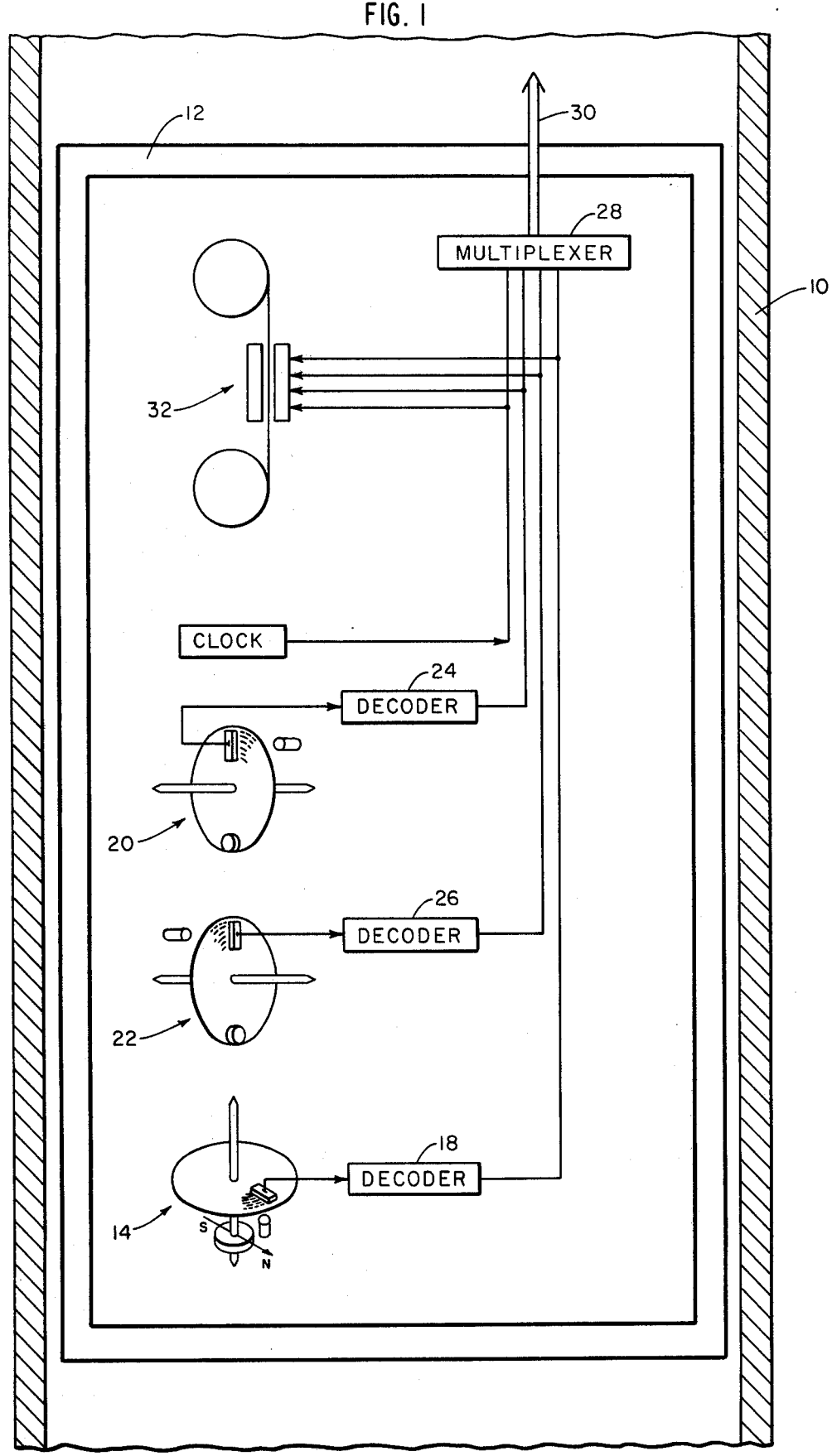
FIG. 1 is a diagrammatic representation of borehole instrumentation according to the invention.

Referring to FIG. 1 there is shown a non-magnetic casing 10 which can be a pipe or drill collar containing the surveying instrumentation and of suitable construction for use within a borehole. A non-magnetic thermally insulative dewar housing 12 of known construction is provided to thermally shield the instrumentation from the environment, and is disposed within casing 10 and contains the orientation apparatus of the invention and may also contain other elements of an overall instrumentation package for particular surveying or drilling purposes. A digital magnetic compass 14 is disposed within housing 12 supported by a gimbal mounting and operative to provide by way of decoder 18 an output signal representative of compass heading. First and second inclinometers 20 and 22 are also mounted within housing 12 disposed orthogonally to each other to provide by way of respective decoders 24 and 26 digital output signals representative of inclination with respect to the respective axes, here designated the X axis and Y axis. The output signals provided by compass decoder 18 and inclinometer decoders 24 and 26 are applied to a multiplexer 28 operative to provide a composite signal to a cable 30 for transmission to the surface of the well for recording and/or use. The decoder output signals can also be provided to a magnetic or other suitable data recorder 32 within housing 12 for in situ recording of the orientation data.

A clock 33 can be provided for clocking of data transmission and recording. It will be appreciated that data representing compass position and multi-axis inclination is provided in digital signal form for direct transmission to the surface without the necessity for removal of the instrument package from the borehole in order to collect orientation data, as in conventional apparatus employing photographic recording techniques perfomed in the borehole. The orientation data is correlated with the depth at which the data was generated, and a depth indication can be provided by any recognized techniques for subsequent processing of surveying data.

The digital compass employed in the present invention is shown in diagrammatic form in FIG. 2. This compass is preferably of the type shown in U.S. Pat. No. 3,888,016 assigned to the assignee of this invention, but can also be of various other constructions to suit particular purposes.

A disk 40 is mounted on a shaft 42 which is supported by upper and lower bearings 44 and 46 for rotation about a normally vertical axis defined by shaft 42. The bearings are supported by a first gimbal ring 48 which is pivotally attached to a second gimbal ring 50, the rings providing relative movement about orthogonal axes for well known universal mounting of the compass for maintenance of a substantially horizontal disposition of the compass. A compass magnet 52 is disposed on shaft 42 below disk 40 and aligns with the earth's magnetic field to provide a relative angular position of disk 40 indicative of compass heading.

The disk 40 includes a plurality of concentric coded tracks 54 each having a different number of alternately light transmissive and opaque segments representing one bit of a multibit digital code. A photosensor array 56 is disposed about a radius of disk 40 and includes a plurality of photosensitive elements each in alignment with a respective track 54 of the disk. A light emitting diode 58 or other appropriate light source is energized to illuminate the tracks 54 of the disk, light transmitted by the coded tracks being received by array 56 to provide a plurality of digital signals representative of rotational position of disk 40 with respect to the stationary array 56. These digital signals are processed by circuitry 18 which provides an output signal representative of compass position and of suitable format for transmission to the well surface. As described in the aforesaid U.S. Pat. No. 3,888,016 the compass output signal can be serial pulses of a number representative of compass position.

The digital inclinometer is shown in FIG. 3 and includes an optically coded disk 70 which can be the same as the disk 40 employed in the digital compass described above and disposed for rotation about a normally horizontal axis defined by axle 72 appropriately supported by bearings 73 and 75 to allow free rotation of disk 70. A weight 74 is disposed at the lower portion of the disk 70 to define a normal or rest position when the housing 12 is vertically aligned. A light emitting diode 76 is provided on one side of the disk and light transmitted through the coded tracks of the disk is received by the photosensor array 78 which provides a plurality of digital signals to associated decoder 24 or 26 which processes the signals to provide a serial pulse train or other appropriate signal format for transmission to the surface or for local recording and representative of inclination of the housing 12 with respect to the associated axis.

The electro-optical sensors can also be of the reflective type such that the light source and photosensors can be disposed on one side of the coded disk. One implementation of such a reflective electro-optical sensor is shown in FIG. 4 and includes a disk 80 having a plurality of concentric coded tracks 82 each having a different number of alternate light reflective and non-reflective segments representing one bit of a multi-bit code. A light emitting diode 84 or other appropriate illumination source is coupled to the respective tracks 82 by means of fiber optic light pipes 86. A plurality of fiber optic light pipes 88 are disposed between respective tracks 82 and respective photosensitive elements 90 or photosensor array 92. Each light pipe 88 is operative to transmit light reflected from a respective track to the associated photosensitive element 90 in response to incident light provided by source 84. The array 92 provides a plurality of digital signals representative of the rotational position of disk 80 with respect to the stationary light pipe assembly. Other optical arrays can alternately be provided for illuminating the coded tracks 82 and for sensing light reflected therefrom.

As discussed above, the orientation data is correlated with the depth of the survey apparatus in the borehole at which the data is provided. A depth sensor of any well known form can be provided as part of the survey apparatus, or the depth can be known from the position of the survey apparatus in the borehole such as by means of the length of the drill string. The azimuth and inclination data can be recorded with a depth indication on recorder 32 or communicated to the surface for recording and/or use.

Although the invention has particular application to borehole surveying, it will be appreciated that the invention is also useful in other installations in which azimuth and inclination data is desired. For example, the invention can be employed in marine buoys to provide signal indications of the orientation of the buoy. The invention is not to be limited by what has been particularly shown and described except as indicated in the appended claims.

What is claimed is:

1. Borehole survey apparatus comprising:
   a non-magnetic housing adapted for disposition in a borehole;
   a digital magnetic compass disposed within said housing and operative to provide a digital output signal representative of the azimuth orientation of said housing;
   wherein said digital magnetic compass includes:
   a normally stationary disk optically coded with a plurality of concentric tracks each having a different number of alternately light responsive and non-responsive segments representing respective bits of a multi-bit code;
   a compass magnet affixed to and rotatable with said disk;
   means for mounting said disk and magnet for rotation about a normally vertical axis to permit alignment of the magnet with the earth's magnetic field to provide a relative angular position of said disk indicative of compass heading;
   means for illuminating the coded tracks of said disk; and
   photosensor means including a photosensor array having a plurality of photosensitive elements each in alignment with a respective coded track and operative to receive light from the coded tracks of said disk and to provide in response thereto a plurality of digital signals corresponding to a multi-bit code representing the relative angular position of said disk with respect to said photosensor means;
   at least one digital inclinometer disposed in said housing and operative to provide a digital output signal representative of the inclination of said housing with respect to a predetermined vertical plane;
   wherein said at least one digital inclinometer includes:
   a normally stationary disk optically coded with a plurality of concentric tracks each having a different number of alternately light responsive and non-responsive segments representing respective bits of a multi-bit code;
   means for mounting said disk for rotation about a normally horizontal axis;

a weight disposed at the lower portion of said inclinometer disk to define a normal position when said housing is vertically aligned;

means for illuminating the coded tracks of said inclinometer disk; and second photosensor means including a photosensor array having a plurality of photosensitive elements each in alignment with a respective coded track and operative to receive light from the coded tracks of said inclinometer disk and to provide in response thereto a plurality of digital signals corresponding to a multi-bit code representing the relative angular position of said inclinometer disk with respect to said second photosensor means; and means disposed in said housing and operative to convey the digital output signals from said digital magnetic compass and from said at least one digital inclinometer to the surface of a borehole.

2. The borehole survey apparatus of claim 1 wherein said output signal conveying means includes a multiplexer operative to combine the output signals from said digital compass and said at least one digital inclinometer into a composite signal for transmission to the surface of said borehole.

3. The borehole survey apparatus of claim 1 having a plurality of digital inclinometers each disposed for disk rotation in a plane orthogonal to the other such that the output signals thereof are respectively representative of the inclination of said housing with respect to a corresponding vertical plane.

4. The borehole survey apparatus of claim 1 wherein said housing is thermally insulative.

5. Borehole survey apparatus comprising:

a non-magnetic housing adapted for disposition in a borehole;

a digital magnetic compass disposed within said housing and operative to provide a digital output signal representative of the azimuth orientation of said housing;

wherein said digital magnetic compass includes:

a normally stationary disk optically coded with a plurality of concentric tracks each having a different number of alternately light responsive and non-responsive segments representing respective bits of a multi-bit code;

a compass magnet affixed to and rotatable with said disk;

means for mounting said disk and magnet for rotation about a normally vertical axis to permit alignment of the magnet with the earth's magnetic field to provide a relative angular position of said disk indicative of compass heading;

means for illuminating the coded tracks of said disk; and photosensor means including a photosensor array having a plurality of photosensitive elements each in alignment with a respective coded track and operative to receive light from the coded tracks of said disk and to provide in response thereto a plurality of digital signals corresponding to a multi-bit code representing the relative angular position of said disk with respect to said photosensor means;

at least one digital inclinometer disposed in said housing and operative to provide a digital output signal representative of the inclination of said housing with respect to a predetermined vertical plane;

wherein said at least one digital inclinometer includes:

a normally stationary disk optically coded with a plurality of concentric tracks each having a different number of alternately light responsive and non-responsive segments representing respective bits of a multi-bit code;

means for mounting said disk for rotation about a normally horizontal axis;

a weight disposed at the lower portion of said inclinometer disk to define a normal position when said housing is vertically aligned;

means for illuminating the coded tracks of said inclinometer disk; and second photosensor means including a photosensor array having a plurality of photosensitive elements each in alignment with a respective coded track and operative to receive light from the coded tracks of said inclinometer disk and to provide in response thereto a plurality of digital signals corresponding to a multi-bit code representing the relative angular position of said inclinometer disk with respect to said second photosensor means; and means disposed in said housing and operative to provide digital output signals from said digital magnetic compass and from said at least one digital inclinometer.

6. The borehole survey apparatus of claim 5 further including means for recording azimuth data from said digital magnetic compass and inclination data from said digital inclinometer with respect to the depth of the survey apparatus in the borehole.

* * * * *